United States Patent

Passarelli et al.

[11] 4,335,706
[45] Jun. 22, 1982

[54] ENERGY COLLECTOR AND TRANSFER APPARATUS

[76] Inventors: Frank J. Passarelli, 1728 Kelton Ave., Los Angeles, Calif. 90024; George A. Matsukas, 1834 W. Hwy. 154, Santa Ynez, Calif. 93460; Charles P. Caspary, 21524 Nordhoff St., Chatsworth, Calif. 91311

[21] Appl. No.: 192,485

[22] Filed: Sep. 30, 1980

[51] Int. Cl.³ .............................................. F24J 3/02
[52] U.S. Cl. ................................ 126/435; 126/438; 126/437; 126/400
[58] Field of Search ............... 126/422, 435, 437, 438, 126/450, 449, 432, 400, 442, 443; 165/104.11, 104.13, 104.14, 104.28; 62/235.1; 237/2 B

[56] References Cited

U.S. PATENT DOCUMENTS

| | | | |
|---|---|---|---|
| 3,981,294 | 9/1976 | Deminet et al. | 126/900 |
| 4,119,143 | 10/1978 | Robinson, Jr. | 126/400 |
| 4,170,984 | 10/1979 | Scheffee | 126/900 |
| 4,186,721 | 2/1980 | Whitman | 126/449 |
| 4,285,333 | 8/1981 | Tanaka et al. | 126/435 |

*Primary Examiner*—James C. Yeung
*Attorney, Agent, or Firm*—Jack C. Munro

[57] ABSTRACT

An energy collector and transferring apparatus which in its first embodiment utilizes three connected closed loop conduit systems. The first closed loop conduit system is to include an energy collector which is to collect not only solar energy but ambient energy. The energy is absorbed within a black liquid flowing through the first conduit system. The first conduit system includes a first energy exchanger wherein the absorbed energy is transferred from black liquid to a second energy absorbing medium. The second energy absorbing medium is cycled within a second closed loop conduit system. A compressor is included within the second closed loop conduit system to condense this medium from a gaseous state to a higher density fluid, thereby substantially raising the temperature. The energy from the second energy absorbing medium is then to be absorbed through an energy exchanger to a third energy absorbing medium of a third closed loop conduit system. In a second embodiment of the present invention, the first and third closed loop conduit systems are combined into a single closed loop conduit system with the second closed loop conduit system functioning to additively supply energy to the single closed loop conduit system.

7 Claims, 4 Drawing Figures

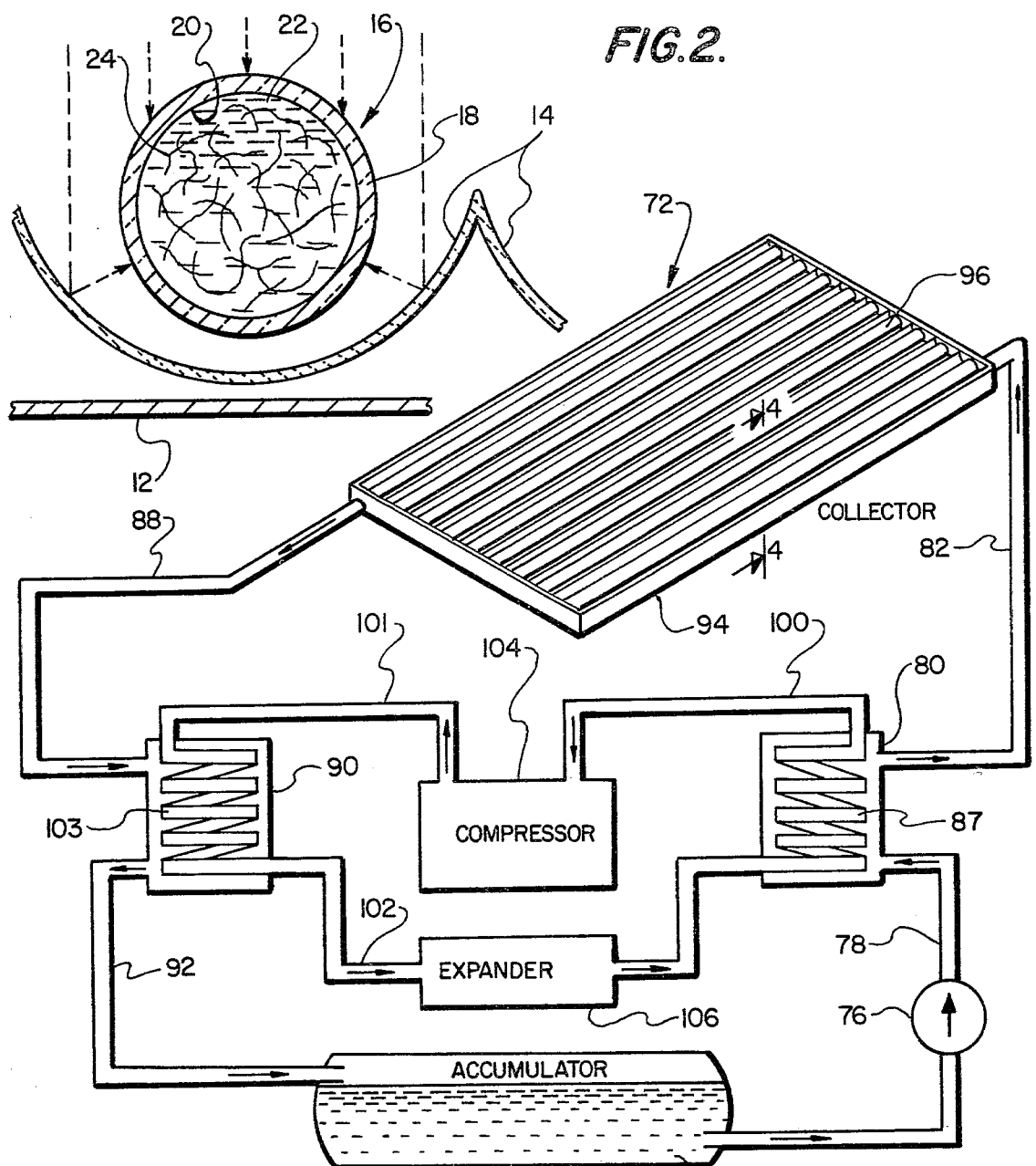
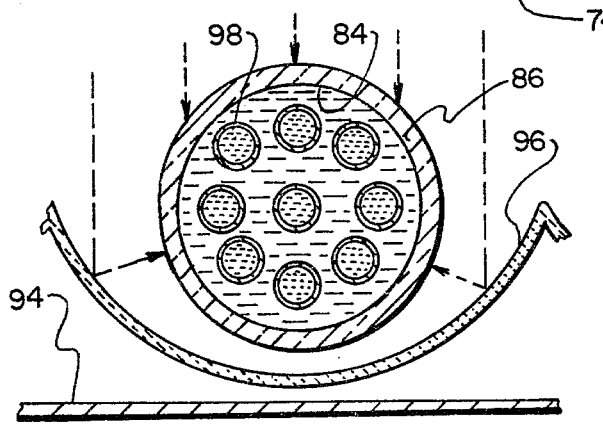
FIG.2.
FIG.3.
FIG.4.

ENERGY COLLECTOR AND TRANSFER APPARATUS

BACKGROUND OF THE INVENTION

The field of this invention relates to an apparatus for concentrating and collecting of solar energy and ambient energy for the conversion thereof to heat energy for the purpose of raising the temperature of a fluid. The present invention relates to a more efficient apparatus for achieving the above result.

Energy emitted from the sun is in the form of radiation which arrives at the earth with a wavelength distribution comprising about three percent ultraviolet rays, forty two percent visible light rays and about fifty five percent infrared rays. It is well known that surfaces exposed to the sun collect at least, to some degree, the solar radiation and that the adsorption of this radiation results in a heating of the material constituting the surface.

In the past there have been many attempts to collect and utilize pollution-free, essentially nonconsumable solar energy to meet energy needs. Recently, much attention has been directed to the conversion and utilization of solar energy because of the realization that fossil fuels are exhaustable and that the burning of these fuels produces pollution. Solar energy, on the other hand, is inexhaustable.

Recently, the shortage of fossil fuels, particularly oil and the high cost thereof, have sparked new attempts at harnessing the energy of the sun. These attempts are generally directed to focusing systems, most using reflecting collectors and including sun tracking systems. There has been a consistent effort to design such solar energy collectors to be as efficient as possible.

A conventional way for the collecting the solar energy employs dark colored panels which are to absorb the solar radiation and combining these panels with a means circulating a heat carrying fluid in a heat exchanging manner within the panels. It is known to improve the efficiency of these panels by placing one or more glass plates above the panels to produce a greenhouse effect for reducing heat losses. However, previously the efficiency of such systems is normally no more than thirty to sixty percent.

A common use for solar energy collector systems is to heat water. This heated water can be utilized in various ways. One way is to function as a preheater for a home water heater. Another common way is to function as a swimming pool heater. The present invention has been found to be particularly useful in the heating of water, but it is to be understood that the present invention can be applied to the heating of any substance, whether liquid, gas or solid.

SUMMARY OF THE INVENTION

The structure of this invention relates to two similar embodiments. Both embodiments include a solar energy collector and a source of liquid to be heated. An inlet side conduit assembly is located between the source of liquid and the inlet side of the collector. An outlet conduit assembly is located between the outlet side of the collector and the source of liquid. Also, in both embodiments, a first heat exchanger is located within the inlet conduit system and a second heat exchanger is mounted within the outlet conduit assembly. Also, both embodiments include a separate closed loop conduit assembly connected between these heat exchangers. The second closed loop conduit system is to include a gas which is to be compressible into a liquid by a compressor. The gas is to absorb energy from the collector and then be compressed into a liquid which substantially increases the temperature of this fluid. The now liquid fluid is to then be conducted into the second heat exchanger which in turn transmits the collected energy into the liquid which is being returned to the source of liquid. Within the first embodiment of this invention, the conduit system, which includes the collector, is closed and there is no mixing with the source of liquid. This collector loop conduit system of the first embodiment is to include a black liquid (darkened as much as possible) to facilitate absorbing of both solar energy and ambient energy within the collector. Also, this collector conduit system is to include a metallic wool through which the black liquid is to be conducted. The metallic wool facilitates the conducting of heat energy and creates turbulence across the entire cross-section of the conduit system. Within the second embodiment of this invention, the source of liquid from the accumulator is transmitted directly through the collector. However, within the collector there is a secondary conduit system within which is located a black liquid which is to function to maximize absorption of energy by the source of liquid.

The primary objective of this invention is to construct a non-complex energy collector and transferring apparatus which substantially exceeds the efficiency of prior art types of energy collector and transferring apparatuses.

Another objective of this invention is to construct an energy collector and transferring apparatus which is composed of few parts and can be manufactured inexpensively.

BRIEF DESCRIPTION OF THE DRAWINGS

FIG. 2 is a cross-sectional view through a portion of the collector employed within the first embodiment of this invention taken along line 2—2 of FIG. 1;

FIG. 3 is a flow diagram of a second embodiment of energy collector and transferring apparatus of this invention; and FIG. 4 is a cross-sectional view through a portion of the collector within the second embodiment of this invention taken along line 4—4 of FIG. 3.

DETAILED DESCRIPTION OF THE SHOWN EMBODIMENTS

Figure 1:
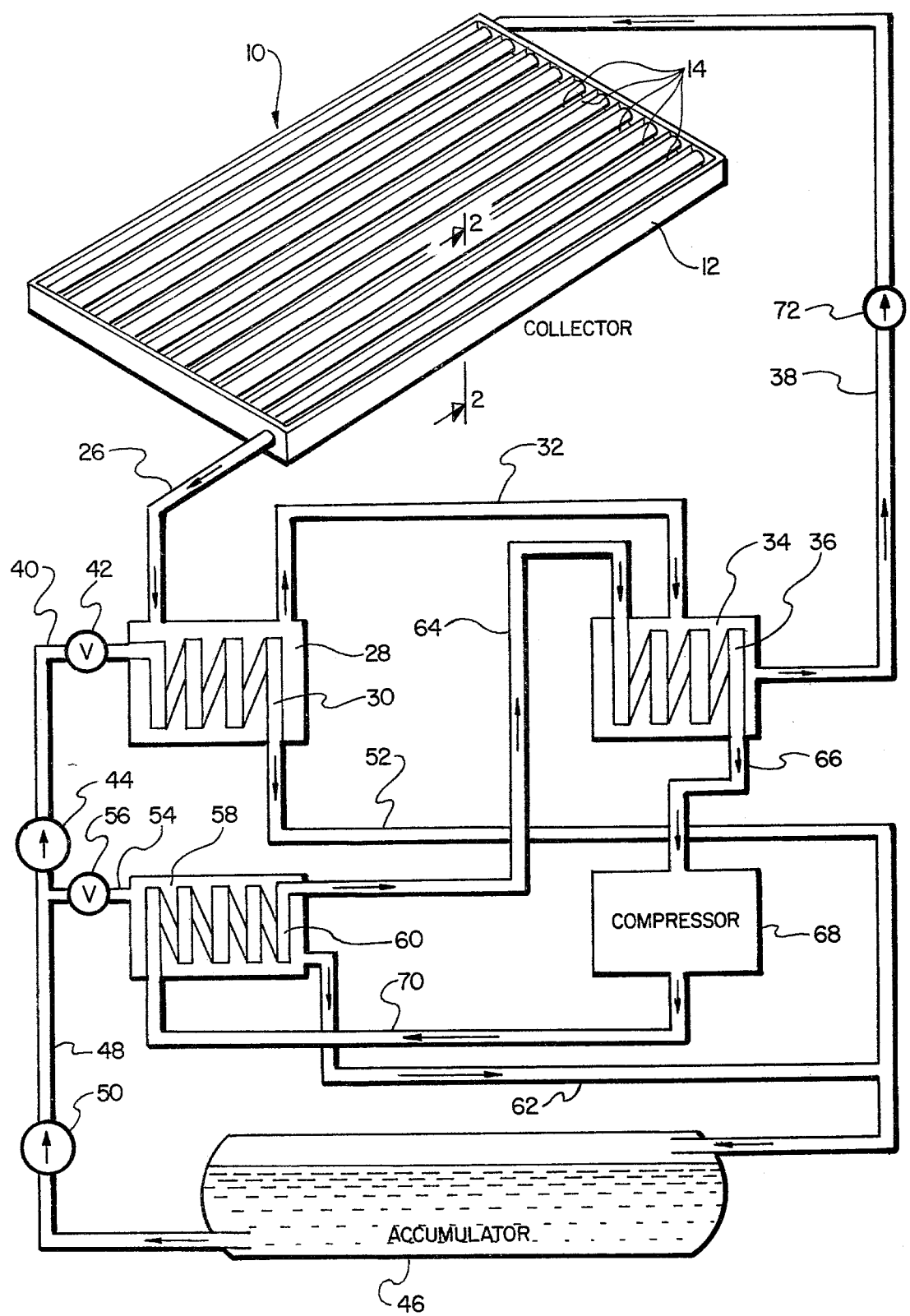
FIG. 1 is a flow diagram of the first embodiment of energy collector and transferring apparatus of this invention.

Referring particularly to FIGS. 1 and 2 of the drawings, there is diagramatically shown an energy collector 10. This collector 10 is depicted to be within a frame 12 which includes a plurality of separate reflective troughs 14. The upper surface of each trough 14 is to reflect energy and direct such toward the heat pipe 16. There is to be a length of heat pipe 16 located within each trough 14 and spaced slightly therefrom, as shown within FIG. 2 of the drawings. The heat pipes 16, for each trough 14, are connected together and form a continuous conduit for liquid. Referring particularly to FIG. 2, the physical size of the heat pipe 16 is out of proportion in relation to the size of the trough 14. In other words, the size of the heat pipe 16 will be substantially smaller, or the size of the trough 14 will be substantially larger.

The outer surface of the heat pipe 16 is constructed of an elongated, transparent, cylindrical member 18. The internal chamber 20 of the member 18 is to be filled with a liquid 22. Also located within the chamber 20 is a quantity of packing material 24. The packing material 24 is to be a metallic wool preferably darkened and also highly heat conductive. In actual practice, it appears that a copper wool would be satisfactory.

It is to be understood that the collector 10 is covered by a transparent cover (not shown). The purpose of this cover is so that the heat pipes 16 are supported within an air space which becomes heated. This air space takes on a green-house effect and is to minimize heat losses to the ambient from the collector 10. Also, as the solar energy that penetrates the heat pipe 16 directly and also that which is reflected by the trough 14 is absorbed the the black liquid 22. This causes the temperature of the black liquid to be raised.

It has been found that the liquid, which is located directly adjacent the wall of the internal chamber 20 is heated to a higher temperature than the black liquid which is located adjacent the center of the internal chamber 20. For maximum efficiency, it would be desirable to have the black liquid heated substantially uniform throughout. To achieve this end result, the wool 24 is located within the internal chamber 20. Since this wool 24 is highly conductive of heat, the heat energy within the liquid 22 adjacent the wall of the internal chamber 20 is conducted into the wool and through the wool to the center of the internal chamber 20. In this manner, a substantially even distribution of heat energy is obtained throughout the black liquid 22. The wool also functions to create turbulence to decrease laminer flow. The turbulence achieves a still further even distribution of heat energy across the cross section of the black liquid 22.

Referring particularly to FIG. 1, it can be seen that the black liquid, after it has been heated within the collector 10, flows through outlet conduit 26 into a first heat exchanger 28. The heat within the black liquid is to be conducted over a series of coils 30 within the first heat exchanger 28. From the first heat exchanger 28, the black liquid is to be flowed through the conduit 32 into a second heat exchanger 34. Within the second heat exchanger 34, the black liquid is then passed over a series of tubes 36. From the second heat exchanger 34, the black liquid is conducted into a conduit 38, which in turn conducts the black liquid back into the collector 10.

Coils 30 are to receive a liquid from a conduit 40. A shut-off valve 42 is employed within the conduit 40. Also, a pump 44 is connected with the conduit 40, whose purpose is to move liquid from an accumulator 46 through conduit 48 and into the first heat exchanger 28. It is to be understood that this movement will occur only when the valve 42 is in the open position. Also, there is a pump 50 mounted within the conduit 48 to facilitate the flow of the liquid from the accumulator 46. The liquid from the tube 30 is to be conducted through a conduit 52 back into the accumulator 46. It is to be understood that the accumulator 46 could take any of numerous forms, such as a swimming pool or an insulated thermal holding tank.

Connected and adapted to receive liquid from the conduit 48 is conduit 54. Within the conduit 54 is a shut-off valve 56. The conduit 54 connects with a third heat exchanger 58. The liquid from the conduit 54 is passed over coils 60 located with the third heat exchanger 58. From the third heat exchanger 58, the liquid is conducted to within conduit 62, which joins with conduit 52 and back into the accumulator 46.

The coils 60 are connected with a conduit 64, which in turn connects with coils 36 formed within the heat exchanger 34. The fluid contained with the coils 36 is discharged into a conduit 66 and into a compressor 68. From the compressor 68, the fluid is conducted to within the conduit 70 and into the coils 60 of the third heat exchanger 58. From the third heat exchanger 58, the fluid is conducted back into the conduit 64.

If the valve 56 is closed and the valve 42 open, the fluid from the accumulator 46 is moved by pumps 50 and 44 into the second heat exchanger 28. This liquid from the accumulator 46 is then to receive heat energy from the black liquid which is moved through the collector by means of a pump 72 located within the conduit 38. The heat absorbed by the liquid from the accumulator is then conducted back into the accumulator through the conduit 52. In this particular situation, the compressor 68 is not operating and there is no fluid moving through the conduits 64 and 70 through the heat exchangers 34 and 58. The black liquid moved through the second heat exchanger 34 serves no useful purpose except to be moved through conduit 38 and back to the collector 10.

If the valve 56 is open and the valve 42 closed (and the pump 44 not operating), the fluid from the accumulator is moved only through third heat exchanger 58. Therefore, the total heat energy to be absorbed by the liquid from the accumulator must be received from the coils 60. The compressor 68 will be operating which will pump a fluid through the conduit 70 into the tube 60, and hence, through the conduit 64 into the coils 36 of the second heat exchanger 34 and then back into the compressor 68 through the conduit 66. The fluid contained within this closed loop system is to be a compressible fluid, such as freon or ammonia. This gas within the coils 36 is to receive heat energy from the black liquid being conducted through the second heat exchanger 34. This causes the gas to further expand absorbing heat energy. This gas is then transmitted through the conduit 66 to the compressor 68, whereupon the gas is compressed into a liquid. It is to be understood that the compressor is to be operated from a source of electrical energy (not shown). The compressor 68 causes the gas to further increase in temperature because of the transformation from a gaseous state to the liquid state. This increase temperature is significant. For example, if the gas entering the compressor 68 is at 200 degrees Fahrenheit, the liquid located within the conduit 70 will be at approximately 285 degrees Fahrenheit.

The heated liquid within the conduit 70 is conducted into the coil 60 over which is passed the liquid from the accumulator 46. As a result, the heat energy from the heated liquid within the coil 60 is conducted into the accumulator liquid within the heat exchanger 58. The fluid being conducted from coils 60 into the conduit 64 then returns to the gaseous state. This gas is then conducted to within the coils 36 of the second heat exchanger 34 and the process repeated.

A particular advantage to the use of the closed loop system as defined by conduits 64 and 70 is that this closed loop system will function as a thermal lock. This means that energy will always go in the direction from the collector to the accumulator and not vice versa.

Referring particularly to FIGS. 3 and 4 of the drawings, there is shown the second embodiment of this invention which employs the use of a collector 72, which is basically similar to the collector 10. One difference with respect to the second embodiment of this invention is that the liquid from the accumulator 74 is moved by pump 76 through conduit 78, heat exchanger 80 and conduit 82 into the internal chamber 84 of the transparent heat pipe 86 located within the collector 72. In other words, this is the only path of movement for the water from the accumulator 74. The accumulator water from the collector 72 is then discharged from the collector 72 through a conduit 88, through a heat exchanger 90, through conduit 92 and back into the accumulator 74.

It is to be understood that the construction of the collector 72 is similar to the construction of the collector 10 and includes a frame 94 and a plurality of side-by-side reflective troughs 96. The exact construction of the heat pipe 86 is different in that located within the internal chamber 84 are a plurality of spaced-apart tubes 98. Within each tube 98 there is to be located a black liquid similar to the black liquid which was defined as being employed within the collector 10. The function of the black liquid within the tube 98 is so as to facilitate absorbing of heat energy within the liquid from the accumulator located within the internal chamber 84. The heat energy which is transmitted through the outer transparent wall of the heat pipe 86 is to be absorbed by the liquid within the internal chamber 84 and also absorbed by the black liquid within the tubes 80 and 98. The heat energy absorbed by the black liquid within the tubes 98 is then emitted into the liquid within the internal chamber 84. Therefore, the reason for the tubes 98 is similar to the use of the wool 24.

In order to increase the efficiency of the second embodiment, there is a separate closed loop system connected between heat exchangers 80 and 90 in the form of conduits 100 and 102. The compressor 104 is located in conjunction with the conduit 100 and an expander 106 is located in conjunction with the conduit 102. The expander 106 will normally comprise no more than an orifice assembly. It is to be understood that within the first embodiment that there also will be an expander before coil 36 within conduit 62.

Fluid, such as freon or ammonia, as previously described, is to be moved through the conduit 100 into compressor 104 and is then compressed into a liquid and is then conducted through conduit 101 into the heat exchanger 90. This liquid then loses heat within coil 103 and moves as a liquid within conduit 102. After passing through expander 106, a substantial decrease in pressure is realized which causes the fluid to become gaseous. The expander 106 is employed to insure that the fluid is in the gaseous state as it passes through the coils 87 of the heat exchanger 80 and back into the compressor 104.

The water from the accumulator 74 is pumped by the pump 76 through the heat exchanger 80 which causes heat energy from the accumulator to be transmitted into the gas being conducted through the coils within the heat exchanger 80. The then cooled accumulator water is conducted through the conduit 82 and into the collector 72. The accumulator water within the collector 72 is to then absorb both ambient and solar energy prior to being discharged through the conduit 88.

The now heated accumulated water within the conduit 88 is conducted over the heated liquid from the compressor 104 and the conduit 100 which is conducted through the heat exchanger 90. This heat energy is released into the accumulator liquid which is then conducted through the conduit 92 and back into the accumulator 74. In other words, it is to be noted that the use of the closed loop comprised of conduits 100 and 102 functions to add heat energy into the accumulator liquid over and above that which is added by the collector 72.

In summary, the structure of this invention is related to an energy collecting and amplifying system in which ambient and solar energy are utilized to create heating of a liquid. The structure of this invention utilizes readily available energy and efficiently collects and transmitts this energy into an accumulated liquid source. The using of the intermediate closed loop within each embodiment causes the fluid to enter the collector at a much lower temperature. Therefore, a greater temperature differential occurs across the collector.

What is claimed is:

1. An energy collector and transferring apparatus comprising:

a first closed loop conduit system having an energy collector, a first energy absorbing medium to be cycled within said first closed loop conduit system, a first energy exchanger and a second energy exchanger being mounted within said first closed loop conduit system, said second energy exchanger being spaced from said first energy exchanger, first pump means to move said first energy absorbing medium through said first closed loop conduit system;

a second closed loop conduit system connected to said second energy exchanger, said second closed loop conduit system cycling a second energy absorbing medium, a third energy exchanger located within said second closed loop conduit system, said third energy exchanger being spaced from said second energy exchanger, compressor means to move said second energy absorbing medium through said second closed loop conduit system; and a third closed loop conduit system connected to said first and third energy exchanger, said third closed loop conduit system cycling a third energy absorbing medium, said third closed loop conduit system including an accumulator, valve means controlling the flow of said third energy absorbing medium between both said first energy exchanger and said third energy exchanger, whereby said energy collector is to cause energy to be absorbed within said first energy absorbing medium and then said absorbed energy is transferred either directly to said third energy absorbing medium at said first energy exchanger or indirectly to said third energy absorbing medium through said second energy exchanger.

2. The apparatus as defined in claim 1 wherein:
    said first energy absorbing medium including a black liquid.

3. The apparatus as defined in claim 2 wherein:
    said collector including a heat pipe, said heat pipe including turbulent means being in continuous contact with said black liquid, whereby said turbulent means is to cause substantial even distribution of heat energy across the cross-sectional area of said heat pipe.

4. The apparatus as defined in claim 3 wherein:

said turbulent means comprises a metallic wool.

5. The apparatus as defined in claim 1 wherein:

said second energy absorbing medium comprising a gas which is to be compressed into a liquid by said compressor, said second closed loop conduit system forming a thermal lock which permits energy to be transmitted only in the direction from said first closed loop conduit system to said third closed loop conduit system and not vice versa.

6. The apparatus as defined in claim 1 wherein:

said first closed loop conduit system including a heat pipe, a plurality of smaller conduits located in a spaced apart manner within said heat pipe, a black liquid to be contained within said smaller conduits, said first energy absorbing medium to flow about said smaller conduits.

7. The apparatus as defined in claim 1 wherein:

said first energy absorbing medium including a black liquid, the composition of said black liquid including water, glycol, alcohol, soot, detergent, graphite and ammonia.

* * * * *